United States Patent [19]

Bisiach

[11] 4,430,037
[45] Feb. 7, 1984

[54] INDUSTRIAL ROBOT WITH SEVERAL AXES OF ROTATION

[76] Inventor: Luciano Bisiach, Strada San Vito Revigliasco 350, 10100 Turin, Italy

[21] Appl. No.: 293,141

[22] Filed: Aug. 17, 1981

[30] Foreign Application Priority Data

Apr. 23, 1981 [IT] Italy ................................ 6755 A/81

[51] Int. Cl.³ .............................................. B25J 9/00
[52] U.S. Cl. ........................................ 414/4; 254/200; 414/735
[58] Field of Search ...................... 414/1, 4, 730, 732, 414/733, 735, 738–741; 254/58, DIG. 2; 74/25

[56] References Cited

U.S. PATENT DOCUMENTS

| 1,279,346 | 9/1918 | Hultgren et al. ............. 254/DIG. 2 |
| 4,275,986 | 6/1981 | Engleberger et al. .......... 414/732 X |
| 4,312,622 | 1/1982 | Fauareto ........................ 414/730 |

FOREIGN PATENT DOCUMENTS

| 2452345 | 5/1976 | Fed. Rep. of Germany ...... 414/732 |
| 2058009 | 4/1981 | United Kingdom ................... 414/4 |

*Primary Examiner*—Robert J. Spar
*Assistant Examiner*—Terrance L. Siemens
*Attorney, Agent, or Firm*—Paul & Paul

[57] ABSTRACT

An industrial robot having several axes of freedom of movement and comprising an operating members supporting arm pivotally mounted at the top of a supporting column for movement about a horizontal axis from a horizontal angular medium position under the control of a linear actuator pivotally connected with one end to the supporting column and the other to the supporting arm. Preferably the linear actuator is an electromechanical jack having a worm and lead nut, the worm being rotatably mounted within an elongated housing and driven by a motor secured to the housing and the lead nut being coupled to an outer tubular jacket.

1 Claim, 3 Drawing Figures

INDUSTRIAL ROBOT WITH SEVERAL AXES OF ROTATION

This invention relates to an industrial robot having several axes of freedom of movement and more particularly to a control system for the vertical lifting movement of the operating arm of the robot.

Industrial robots are operating machines for controlled movement of an operating head or tool to any position within a predetermined area of operation and for giving the operating head or tool a desired orientation. Generally, the tool carrying head can move along two or three coordinates in the space and also be oriented along two or three angular coordinates. Consequently, industrial robots usually have four, five or six independent axes of movement each controlled by an actuator. Many kinematical structures have already been proposed to obtain all the desired movements and generally these structures achieve the desired result by a combination of linear and angular movements. While the linear movements are generally obtained by carriages controlled by hydraulic or electromechanical jacks, for example, of the type having a screw and lead nut, for obtaining the angular movements a great variety of devices is used such as chains and chain wheels, worm reduction gears, reduction gears known under the trade name "Harmonic Drive" and the like.

A very common type of industrial robot comprises a column mounted on a fixed base for translating or rotary movement and supporting a swingable arm movable about a horizontal axis for carrying out a lifting movement. The arm in turn supports a carriage for obtaining a third linear movement and mounted on the carriage is a tool carrying head.

However, the actuators hitherto used for obtaining the lifting movement of the swingable arm are not quite satisfactory mainly because the drive torque applied to the swingable arm for turning it about its horizontal axis of rotation must overcome a very high inertia torque due to the presence of relatively heavy devices supported by the swingable arm at a considerable distance from its axis of rotation. The problem is still complicated by the fact that this distance is variable and consequently also the inertia torque varies with the movement of the carriage along the swingable arm.

For this reason the conventional actuators such as worms and worm gears and other conventional devices employing gears, which act with a small force transmitting arm on the members to be rotated, are not capable of ensuring the accuracy required in a manipulating robot as used in modern industry.

It is therefore an object of the present invention to provide an industrial robot of the type described above, which is provided with means for controlling the lifting movement of the swingable arm in such a manner as to ensure accurate positioning thereof even if it is weighted by heavy members spaced from the axis of rotation of the arm and even if the inertia torque acting on the arm varies due to the movement of the carriage along the arm.

Another object of the invention is to provide an industrial robot having means for controlling the lifting movement of the swingable arm and which is particularly resistant to wear and to the consequences of wear on the accuracy of positioning.

Another object of the invention is to provide an electromechanical actuator forming part of the means for controlling the lifting movement of the swingable arm in the industrial robot as described above.

The invention provides an industrial robot having several axes of freedom of movement and comprising an operating members supporting arm pivotally mounted at the top of a supporting column for angular movement about a horizontal axis from a horizontal angular medium position, characterized in that angular positioning of the supporting arm is controlled by a lifting jack having one end pivotally connected to said supporting arm in a position spaced from said horizontal axis of angular movement and the other opposite end pivotally connected to said supporting column.

Said lifting jack may be an electromechanical actuator which according to the invention comprises a threaded shaft rotatably mounted at its two opposite ends in bearings connected to each other by rigid walls forming at least one linear guide member, a lead nut meshing with said threaded shaft and provided with at least one projecting lug for slidably engaging said linear guide member, and a tubular outer jacket rigidly secured to said projecting lug of said lead nut and having at one end means for pivotal connection to said supporting arm.

A preferred embodiment of the invention will now be described by way of example and with reference to the accompanying drawings, in which.

Figure 1:
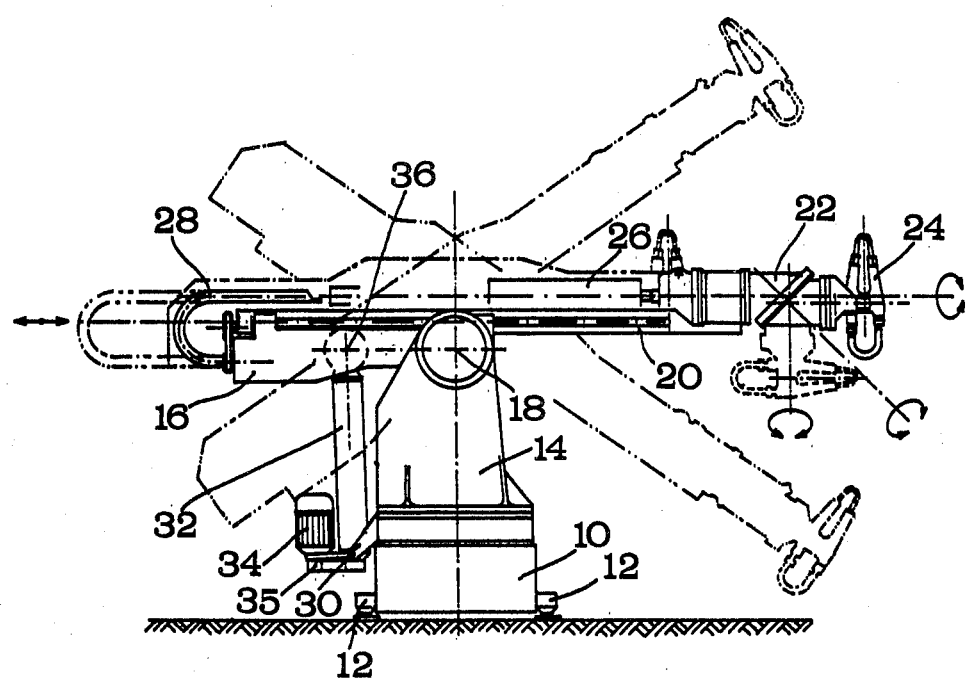
FIG. 1 is a schematic side view of an industrial robot according to the invention.

FIG. 1 shows the industrial robot according to the invention in full lines in the neutral or inoperative position. This robot carries a tool supporting head, for example for welding. For further details of the tool supporting head, reference may be had to Italian Patent Application No. 68126-A/77 filed May 19, 1977 by the same Applicant. For further illustration of the kinematic mechanism of the robot, the swingable supporting arm thereof is shown in dash-and-dot lines in an elevated and in a lowered position. Of course, apart from welding this robot may also be used for other purposes, for example, for handling workpieces or the like.

As shown in FIG. 1, the robot is mounted on a fixed base 10 through a supporting column 14 which is rotatable by drive means, not shown. However, the supporting column 14 may also be mounted for translating movement on the base 10 by means of appropriate guide tracks, not shown. The base 10 is supported on the ground by means of adjustable feet 12.

A swingable supporting arm 16 is mounted for angular movement about a horizontal axis of rotation 18 at the top of the supporting column 14. The swingable supporting arm 16 comprises a cradle and guide tracks for a carriage 20 mounted for linear translating movement along these guide tracks. Mounted at one end of the carriage 20 is a tool supporting head 22 having several degrees of freedom of movement, for example, as described in Applicant's aforementioned prior application. The tool supported by the head 22 may be, for example, a conventional electrical resistance welding gun 24. Electric current is supplied to the welding gun 24 through feed cables accommodated in the interior of the head 22, from a rotary transformer 26 supplied by flexible sheathed cables 28, as described in said prior application.

For controlled positioning of the swingable supporting arm 16 for bringing it into the desired angular position, the invention provides a linear actuator formed by an electromechanical jack 32 having one end pivotally connected to a bracket 30 projecting from one side of the supporting column 14. The electromechanical jack 32 is driven by an electric motor 34 secured thereto and will be described in greater detail hereinafter. The opposite end of the electromechanical jack 32 is pivotally connected at 36 to the swingable supporting arm 16 at a predetermined distance from its axis of rotation 18.

The actuator 32 is so arranged relative to the supporting column 14 and the swingable supporting arm 16 that the points of reaction of the forces transmitted between these three members during movement of the arm 16 will be located at the vertices of a triangle which, although it will change its shape during rotation of the arm 16, will nevertheless have approximately equal sides so that the pulling or pressing force exerted by the actuator 32 will constantly remain approximately equal to the weight of the tool supporting head 22 and the tool 24 supported thereby.

Although the actuator 32 may be of different types, for example, may be a hydraulic or the like jack, according to the invention is of an electromechanical type as will be described hereafter. This type ensures greatest rigidity of the actuator under the compressive load to which it is subjected in some of its operating positions.

Figure 2:
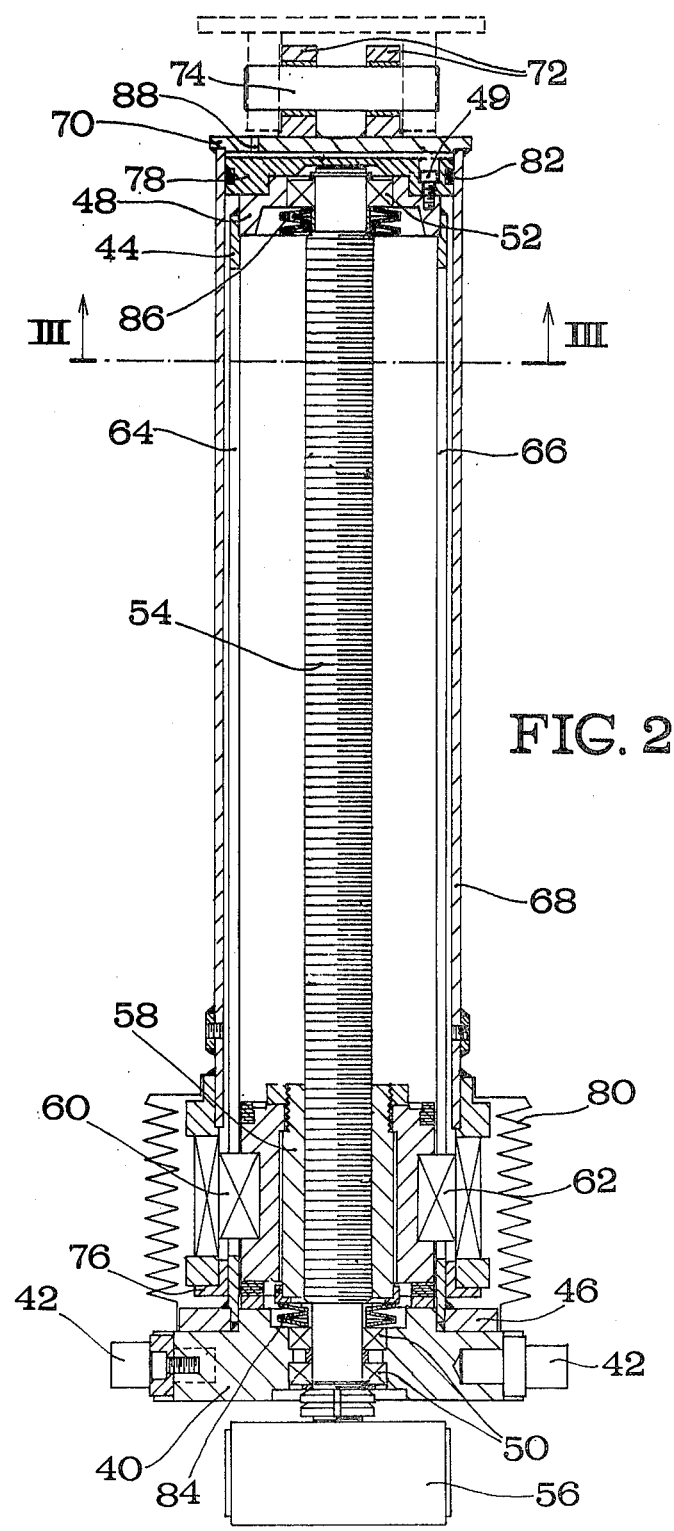
FIG. 2 is an axial section through the mechanical lifting jack used in the robot of FIG. 1.
Figure 3:
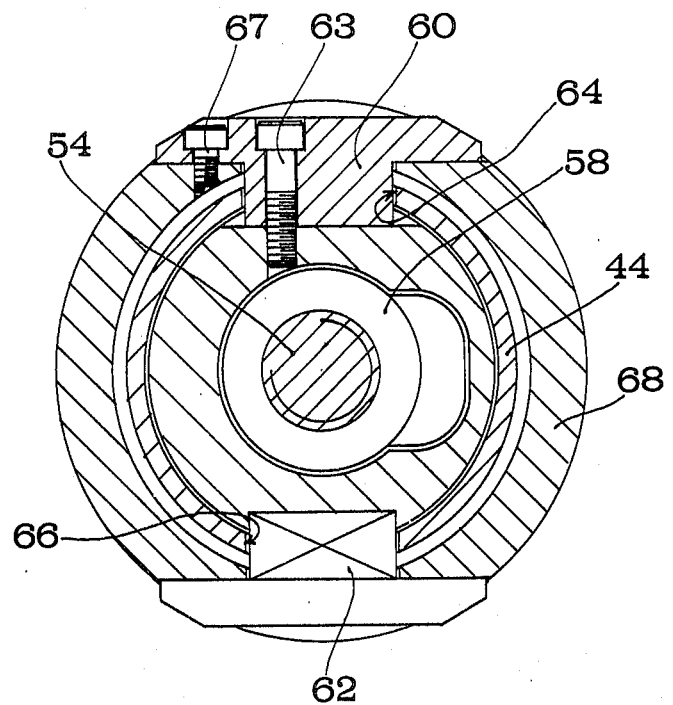
FIG. 3 is a transverse section taken on the line III—III of FIG. 2.

Referring now to FIGS. 2 and 3, an actuator according to the preferred embodiment of the invention comprises a plate 40 provided with pivots 42 for swingable connection to the bracket 30 on the supporting column 14 (FIG. 1) and serving as a base for a tubular member 44 secured to the plate 40 by a ring 46 which may be welded in position. Laterally secured to the plate 40 is the electric motor 34 shown in FIG. 1. The distal end of the tubular member 44 is provided with a closure cap 48 and both the plate 40 and the closure cap 48 are provided with a bearing 50 and 52, respectively, for rotatably mounting the two ends of a threaded shaft or worm 54 whose one end extends beyond the plate 40 and carries a pulley 56 driven by the electric motor 34 of FIG. 1 through a toothed belt 35.

The electric motor 34 may be a direct current collector motor or an alternating current induction motor and is accurately controlled in a manner known per se by digital control means such as a process computer, not shown.

The assembly formed of the plate 40, tubular member 44 and cap 48 thus defines a rigid housing in which the threaded shaft 54 is rotatably mounted. The housing thus defined contains a lead nut 58 meshing with the threaded shaft 54 and provided with diametrically opposed projecting lugs or keys 60 and 62 secured in position by screws 63 and projecting from the tubular member 44 through longitudinal slots 64 and 66 provided therein for this purpose. Preferably the assembly of the lead nut 58 and threaded shaft 54 is formed by a unit comprising a lead nut and worm containing circulating balls, as is known in the art, to improve the positioning accuracy and reduce wear.

The keys 60, 62 of the lead nut 58 are secured by screws 67 to a tubular outer jacket 68 extending coaxially of the threaded shaft 54 and closed at the distal end by a cap 70 preferably welded thereto and provided with connecting lugs 72 for pivotal connection to the swingable supporting arm 16 of FIG. 1 by means of a pin 74. The tubular outer jacket 68 is provided at one end with a slide ring 76 mounted for sliding movement on the surface of the tubular member 44 and at the other end the closure cap 48 has a disk 78 secured thereto by screws 49, the disk 78 being provided with a sealing gasket 82 to serve as a guide for the movement of the tubular outer jacket 68 and at the same time as a sealing piston.

As will be evident from the foregoing description, when the pulley 56 rotates, the lead nut 58 will move along the threaded shaft or ball worm 54 and shift the outer tubular jacket 68 which is guided on the ring 76 and disk 78 serving as slide bearings, to vary the distance between the points of pivotal connection 42 and 74 of the actuator. Preferably the end of the tubular outer jacket 68 is connected to the plate 40 by protecting bellows 80.

It will be evident that the described structure has a great rigidity due to the considerable distance between the points of support of the jacket 68 and this rigidity will substantially be maintained even in the position of greatest extension of the actuator. Further, the circumference of the supporting surface has a considerable diameter so that the supporting force is distributed with low unit load and a geometrical configuration avoiding bending.

According to a further advantageous feature of the invention, as shown by the sealing gasket 82 in FIG. 2, the tubular outer jacket 68 and the tubular member 44 together form a piston-cylinder arrangement in which the space between the disk 78 and the cap 70 is subjected to air compression or rarefaction according to the contraction or extension of the actuator. For this purpose a gauged hole 88 is provided in the cap 70 so that this effect can be utilized for shock absorption during operation of the actuator, particularly when the motor should suddenly break down, to slow down the free movement of the lead nut. As a further measure of safety to avoid free falling of the swingable supporting arm 16 in case of breakdown of the motor 34, a set of Belleville absorber springs 84 and 86, respectively, is mounted at each end of the threaded shaft 54.

Although a preferred embodiment of the invention has thus been described in detail and illustrated in the accompanying drawings, it is to be understood that the invention is not limited to this precise embodiment and that numerous changes and modifications obvious to one skilled in the art may be made therein without departing from the scope of the invention as defined by the appended claims.

I claim:

1. An industrial robot having several axes of freedom of movement with an operating members supporting arm pivotally mounted at the top of a supporting column for angular medium position and characterized in that angular positioning of said supporting arm is controlled by an electromechanical actuator having one end pivotally connected to said supporting arm in a position spaced from said horizontal axis of angular movement and the other opposite end pivotally connected to said supporting column and comprising a. a threaded shaft mounted at its two opposite ends in bearings connected to each other by rigid walls forming at least one linear guide member;

b. a lead nut meshing with said threaded shaft and provided with at least one projecting lug for slidably engaging said linear guide member; and c. a tubular outer jacket secured to said projecting lug of said lead nut and being sealingly connected to one of said bearings of threaded shaft which is in the form of a piston and having a bottom provided with a gauged hole communicating with the atmosphere.

* * * * *